UNITED STATES PATENT OFFICE.

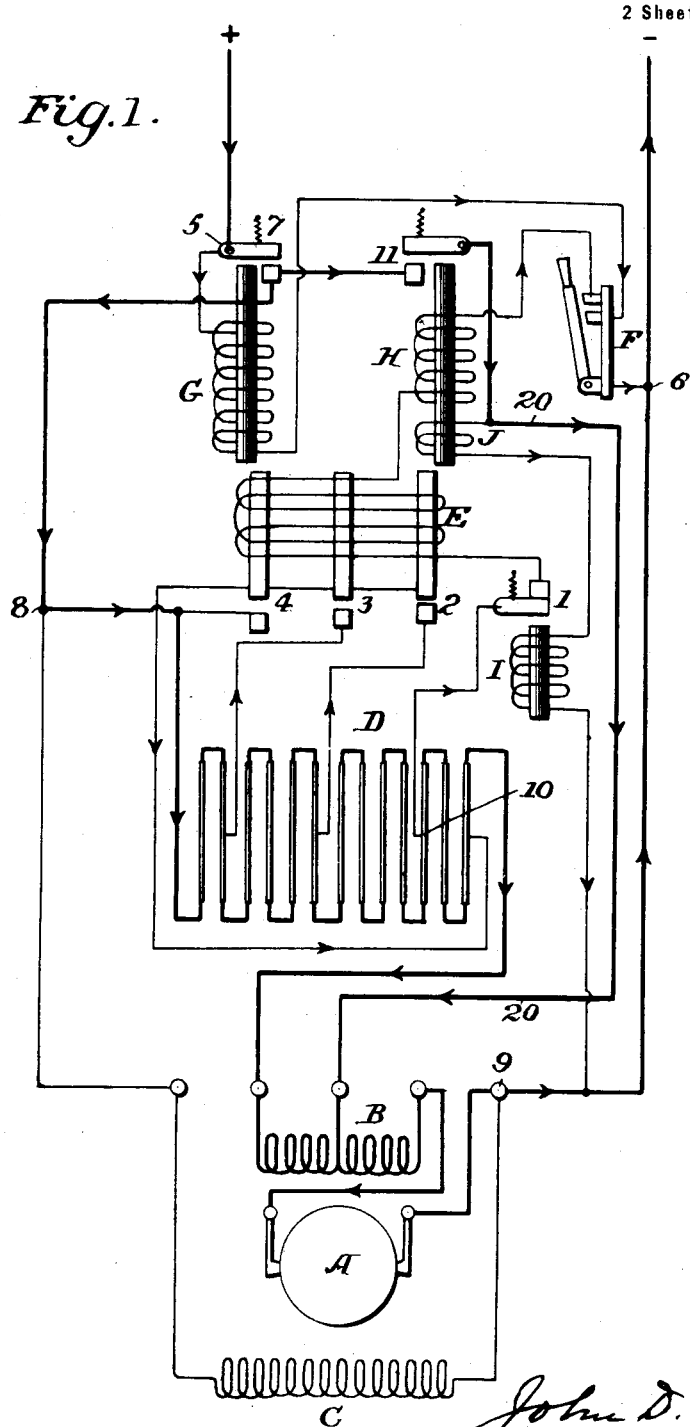

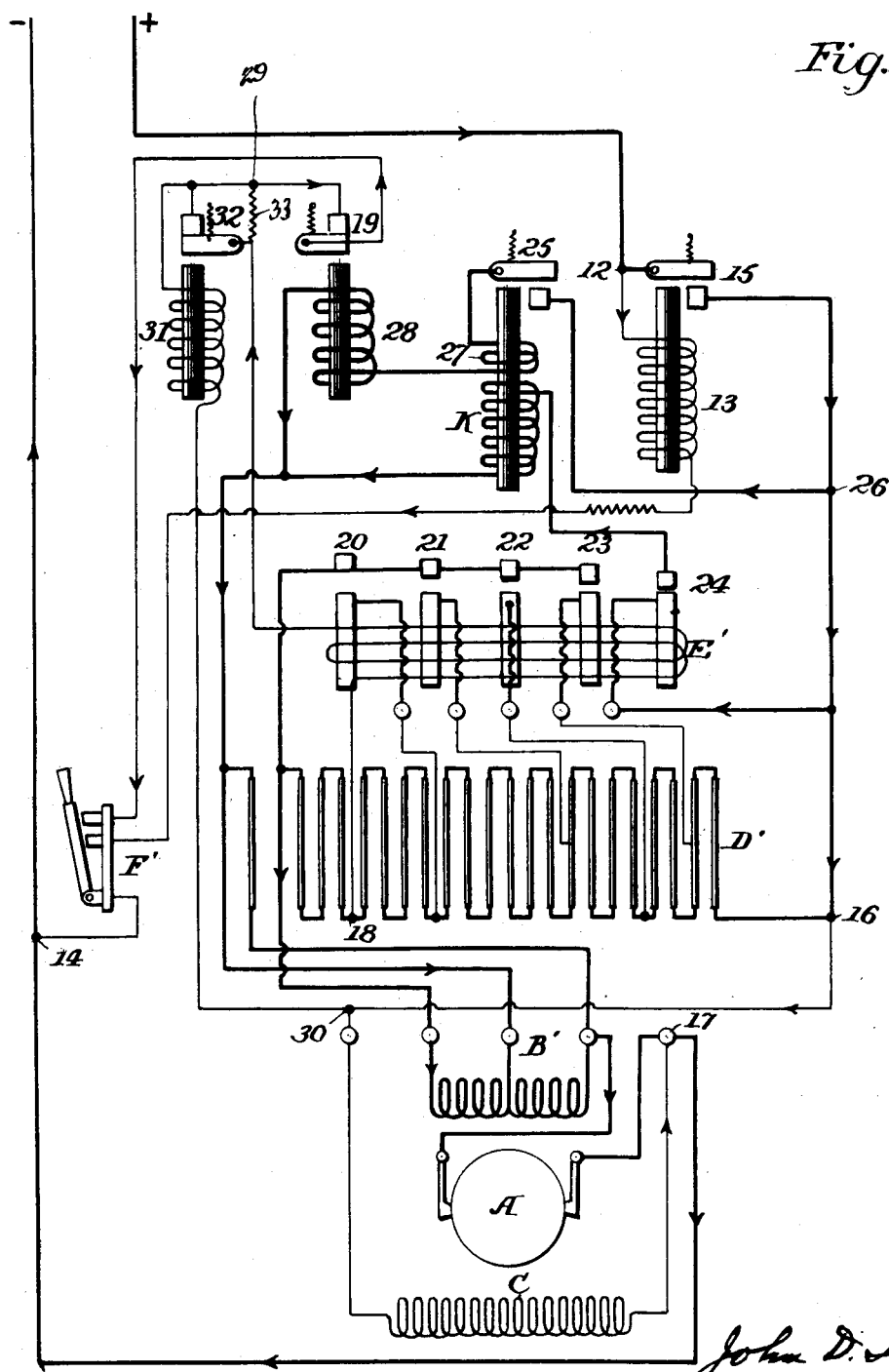

JOHN D. IHLDER, OF YONKERS, NEW YORK, ASSIGNOR TO OTIS ELEVATOR COMPANY, OF EAST ORANGE, NEW JERSEY, A CORPORATION OF NEW JERSEY.

MOTOR CONTROL.

SPECIFICATION forming part of Letters Patent No. 713,222, dated November 11, 1902.

Application filed January 3, 1902. Serial No. 88,333. (No model.)

*To all whom it may concern:*

Be it known that I, JOHN D. IHLDER, a citizen of the United States, residing at Yonkers, in the county of Westchester and State of New York, have invented certain new and useful Improvements in Motor Control, of which the following is a specification.

My invention relates to the operation of machinery in general, but more particularly to its operation by electricity where long runs are made, during which the electric motor is running continuously; and my invention has for its object to produce a safe and efficient motor-control apparatus which is prevented from overheating during the operation of the motor.

My invention consists, primarily, in an apparatus for controlling motors in which the electrical means for controlling the starting of the motor are automatically deënergized after the motor has started, so that they do not consume current thereafter during the operation of the motor, and hence do not become excessively heated, as do devices which remain in circuit during the entire time the motor is in operation.

My invention further consists in the arrangement of circuits and construction of apparatus more fully described and shown in the accompanying specification and drawings, in which—

Figure 1 is a diagrammatic representation of circuits and apparatus embodying one form of my invention, and Fig. 2 is a like diagram embodying a modification thereof.

Referring to the drawings, A represents a suitable motor, in this instance an electric motor, which may be adapted to operate the desired machinery. The motor is provided with suitable field-windings, as a series field B, and a shunt-field C, while D represents the armature resistance or starting resistance adapted in this instance to be automatically cut out of circuit upon starting the motor.

Any suitable means may be provided for controlling the starting resistance D and gradually cutting it out of the armature-circuit as the motor starts; but I prefer electromagnetic means, as that represented by the magnet E, deriving its energy from the main motor-circuit. Preferably the circuit of the magnet E is connected to such points on the main motor-circuit that its electric potential increases as the speed of the armature increases upon starting, so that by arranging a number of contacts at different distances from the magnet E or arranging them at the same distance, but providing them with springs of different strengths or any other equivalent arrangement, the contacts may be made to operate successively in accordance with the increase of electric potential in the circuit of the magnet. It will be understood, of course, that a series of magnets instead of one magnet E may be used.

In the drawings, 2 3 4 represent a series of contacts so arranged that they are operated successively in the order named, thereby short-circuiting successive portions of the starting resistance D as they operate. Where, for instance, a pump is being operated by the motor A, the motor may be running for a considerable length of time continuously and with the ordinary arrangement of controlling-circuits for the motor a magnet—such as magnet E, for instance—would remain energized during the whole run, and it is liable to become overheated, which is detrimental to the proper electrical operation of the magnet upon next starting up the motor after it is once stopped. The usual injurious effects from overheating of course occur, and my invention obviates this trouble by automatically deënergizing the magnet E and the whole circuit in which it is included as soon as the motor has reached substantially normal speed upon starting.

An understanding of my invention may be readily obtained by tracing out the circuits, as follows:

F represents a suitable operating-switch normally open when the motor is at rest, and, assuming that this switch is closed to start the motor, the circuit will first be completed from the point 5 on the positive main (indicated by +) to a magnet G, thence to the switch F and to the negative main (indicated by −) at 6. The energizing of magnet G closes contacts 7 and closes the main motor-circuit,

ture-circuit except for the fact that a short circuit is maintained around the accelerating-magnet and the resistance during the operation of the motor. The operation of my apparatus is preferably automatic; but I am not to be understood as limiting myself to the precise means shown and described for obtaining this automatic operation nor to the circuits and connections shown, since many different devices and circuits and connections may be devised for accomplishing the same results which would come within the spirit of my invention. The accelerating-magnet could of course be connected directly across the brushes of the machine and operate in the manner described; but I prefer to connect this magnet in a circuit shunting the armature, the series field-winding, and a portion of the armature resistance, preferably a small portion. In other words, the accelerating-magnet is included in a shunt-circuit derived from points on the armature-circuit which include between them the series field and a portion of the armature-resistance, or the circuit may shunt the armature and series field only, if desired. By this arrangement a certain amount of resistance is included in the circuit of the accelerating-magnet across the brushes of the motor so that as the motor speeds up and its counter electromotive force increases contact 20 of the accelerating-magnet will be closed under a higher potential than that produced by the rotating armature.

It will be seen that the short circuit adapted to be maintained around the armature-resistance, and preferably, as shown, a portion of the series field-winding also, is jointly controlled by the circuit of the accelerating-magnet and another circuit, which becomes energized when the said short circuit is energized, while means are also provided included in said other circuit for controlling the circuit of the accelerating-magnet.

I do not herein claim any of the apparatus nor features as fully shown and described in my copending application, Serial No. 88,111, filed January 2, 1902, for elevators.

Without limiting myself to the precise construction and arrangement of parts shown, I claim—

1. The combination with a motor, of devices for controlling the starting of the motor and means for energizing said devices until the motor has come up to speed and for then maintaining the same deënergized during the operation of the motor, substantially as described.

2. The combination with a motor, and its armature resistance, of means for controlling said resistance, and means for rendering said controlling means inoperative when the motor has reached normal speed, substantially as described.

3. The combination with a motor, its armature resistance and means for controlling said resistance, of means for rendering said controlling means inoperative while at the same time closing a normally open short circuit around the resistance after the motor starts, substantially as described.

4. The combination with a motor, its armature resistance and electromagnetic means for controlling said resistance as the motor starts, of means for deënergizing said electromagnetic resistance - controlling means after the motor has started and has attained normal speed, substantially as described.

5. The combination with a motor, its armature resistance, and electromagnetic means for controlling said resistance as the motor starts, of means for deënergizing said electromagnetic resistance - controlling means after the motor has started, and means for preventing the inclusion of the resistance in the armature-circuit again until the motor-circuit is broken, substantially as described.

6. The combination with a motor, and its starting resistance, of electrical means for automatically cutting out said starting resistance as the motor starts, and means for automatically deënergizing said electrical means after the motor has started, while at the same time closing a normally open short circuit around said armature resistance, substantially as described.

7. The combination with a motor, and its armature resistance, of electrical means for controlling said resistance, and means dependent for operation upon the speed of the motor for deënergizing said controlling means after the motor has started, substantially as described.

8. The combination with a motor, of electrical means for controlling the starting of the motor, and means dependent for operation upon counter electromotive force for deënergizing said electrical means after the motor has started, substantially as described.

9. The combination with a motor, of electrical means for controlling the starting of the motor, means for deënergizing said electrical means after the motor has started, and means for maintaining said electrical means deënergized during the operation of the motor, substantially as described.

10. In an apparatus for controlling motors, the combination of electrical means for cutting out armature resistance on starting the motor, and means operative at a predetermined motor speed for automatically cutting out said electrical means when the motor has started, substantially as described.

11. The combination with a motor, its armature resistance, and electromagnetic means for controlling said resistance, of means for deënergizing said controlling means after the motor has started and for preventing the insertion of the resistance in circuit again until the motor-circuit is broken, substantially as described.

12. The combination with a motor, of electrical means connected in shunt to the armature for controlling the starting of the motor, and means for deënergizing said shunt to the armature during the operation of the motor, substantially as described.

13. The combination with a motor, of electrical means connected in shunt to the armature for controlling the starting of the motor, and means for deënergizing said shunt to the armature after the motor has reached substantially normal speed, substantially as described.

14. The combination with a motor, of electrical means connected in shunt to the armature for controlling the starting of the motor, and means for automatically deënergizing said shunt to the armature after the motor has reached substantially normal speed, substantially as described.

15. The combination with a motor, of an accelerating-magnet, and means dependent for operation upon the speed of the motor for deënergizing the same after the motor has started, substantially as described.

16. The combination with a motor, of an accelerating-magnet, and means automatically operative at a predetermined motor-speed for deënergizing the same after the motor has started, substantially as described.

17. The combination with a motor, of an accelerating-magnet, and means for automatically deënergizing the same after the motor has reached substantially normal speed, substantially as described.

18. The combination with a motor, of an accelerating-magnet, and means dependent for operation upon the speed of the motor for preventing the same from heating during the operation of the motor, substantially as described.

19. The combination with a motor, and its armature resistance, of means for controlling the starting of the motor connected in a circuit shunting the armature, the series field-winding, and a portion of the armature resistance, substantially as described.

20. The combination with a motor, and its armature resistance, of an electromagnet for controlling said resistance connected in a circuit shunting the armature, the series field-winding, and a portion of the armature resistance, substantially as described.

21. The combination with a motor, and its armature resistance, of an electromagnet for controlling said resistance connected in a circuit shunting the armature and the series field-winding, substantially as described.

22. The combination with a motor, and its armature resistance, of motor-controlling means connected in a circuit shunting the armature, the series field-winding, and a portion of the armature resistance, substantially as described.

23. The combination with a motor, and its armature resistance, of motor-controlling means connected in a circuit shunting the armature and the series field-winding, substantially as described.

24. The combination with a motor, of an accelerating-magnet adapted to be energized until the motor has attained substantially normal speed and then deënergized, substantially as described.

25. The combination with a motor, its armature resistance, and means for controlling said resistance, of means in the circuit of said controlling means controlling a short circuit around said resistance, and means adapted to be energized when said short circuit is closed for controlling the circuit of said controlling means, substantially as described.

26. The combination with a motor, its armature resistance, and means for controlling said resistance, of a short circuit around said resistance, means for controlling the same, and means adapted to be energized when said short circuit is closed for controlling the circuit of said controlling means, substantially as described.

27. The combination with a motor, its armature resistance, and means for controlling said resistance, of a short circuit around said resistance jointly controlled by the circuit of said resistance-controlling means and another circuit adapted to be energized when said short circuit is closed, and means also included in said other circuit for controlling the circuit of said resistance-controlling means, substantially as described.

28. The combination with a motor, its armature resistance, and means for controlling said resistance, of a normally open short circuit around said resistance jointly controlled by the circuit of said resistance-controlling means and another circuit adapted to be energized when said short circuit is closed, and means also included in said other circuit for breaking the circuit of said resistance-controlling means, substantially as described.

29. The combination with a motor, its armature resistance, and means for controlling said resistance, of a short circuit around said resistance jointly controlled by itself and a circuit controlled by the circuit of said controlling means, and means included in said short circuit for controlling the circuit of said resistance-controlling means, substantially as described.

30. The combination with a motor, its armature resistance and means for controlling said resistance, of a short circuit around said resistance jointly controlled by itself and a circuit controlled by the circuit of said controlling means, and means also included in said short circuit for breaking the circuit of said resistance-controlling means, substantially as described.

31. The combination with a motor, and its controlling-circuit, of automatic means in said circuit for successively cutting out the starting resistance and short-circuiting the same as the electric potential of said controlling-circuit increases with the increase of speed of the armature of the motor, and means for deënergizing said controlling-circuit after the motor has attained substantially normal speed, substantially as described.

32. The combination of a motor, its armature resistance a normally open short circuit around said resistance, a circuit containing means for controlling the armature resistance, means for successively cutting out said resistance and closing said short circuit automatically in accordance with the increase of electric potential in the circuit containing the resistance-controlling means as the motor attains normal speed, and means for deënergizing said circuit containing the resistance-controlling means when the motor reaches substantially normal speed, substantially as described.

In testimony whereof I have signed my name to this specification in the presence of two subscribing witnesses.

JOHN D. IHLDER.

Witnesses:
F. W. NEWELL,
C. I. HOLBROOK.